United States Patent
Nagasawa (10) Patent No.: US 10,734,849 B2
(45) Date of Patent: Aug. 4, 2020

(54) STATOR OF MOTOR HAVING UPPER AND LOWER INSULATOR

(71) Applicant: Nidec Corporation, Kyoto (JP)

(72) Inventor: Jun Nagasawa, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 55 days.

(21) Appl. No.: 15/986,922

(22) Filed: May 23, 2018

(65) Prior Publication Data

US 2019/0157917 A1    May 23, 2019

(30) Foreign Application Priority Data

May 31, 2017   (JP) ................... 2017-108449

(51) Int. Cl.
| | |
|---|---|
| *H02K 1/14* | (2006.01) |
| *H02K 1/27* | (2006.01) |
| *H02K 3/34* | (2006.01) |
| *H02K 3/52* | (2006.01) |
| *H02K 1/18* | (2006.01) |
| *H02K 3/46* | (2006.01) |

(52) U.S. Cl.
CPC .............. *H02K 1/14* (2013.01); *H02K 1/187* (2013.01); *H02K 1/2786* (2013.01); *H02K 3/34* (2013.01); *H02K 3/345* (2013.01); *H02K 3/46* (2013.01); *H02K 3/522* (2013.01)

(58) Field of Classification Search
CPC ...................................... H02K 1/14; H02K 1/187; H02K 1/27; H02K 1/2786; H02K 3/34; H02K 3/345; H02K 3/46
USPC ................. 310/89, 179, 180, 186, 214, 215
See application file for complete search history.

(56) References Cited

U.S. PATENT DOCUMENTS

| | | | | |
|---|---|---|---|---|
| 8,207,643 B2* | 6/2012 | Horng | ................... | H02K 5/1675 310/67 R |
| 2007/0231163 A1* | 10/2007 | Liu | ...................... | F04D 25/0613 417/354 |
| 2010/0272586 A1* | 10/2010 | Hsu | ....................... | F04D 29/063 417/354 |
| 2013/0193800 A1* | 8/2013 | Yokogawa | ............. | H02K 3/345 310/215 |

(Continued)

FOREIGN PATENT DOCUMENTS

| | | |
|---|---|---|
| DE | 10 2014 216 831 A1 | 2/2016 |
| JP | 2005-027442 A | 1/2005 |

(Continued)

OTHER PUBLICATIONS

Takada et al., English Machine Translation of JP 2005-027442 (Year: 2005).*

*Primary Examiner* — Alfonso Perez Borroto
*Assistant Examiner* — Rashad H Johnson
(74) *Attorney, Agent, or Firm* — Keating & Bennett (57) ABSTRACT

An upper insulator and a lower insulator each include extended portions each extending in a circumferential direction near a radially outer end of a corresponding one of teeth. The teeth are each provided with a coil formed of a conducting wire that is wound around the tooth with the upper insulator and the lower insulator in between. The extended portions of the lower insulator each have a guide portion at an edge on a circumferentially outer and upper side near a region where the conducting wire is led from the upper side toward the lower side when wound into the coil.

11 Claims, 7 Drawing Sheets

(56) References Cited

U.S. PATENT DOCUMENTS

2014/0159520 A1* 6/2014 Jang .................. H02K 1/18
                                                310/71
2015/0318762 A1   11/2015 O
2017/0126309 A1*  5/2017 Rupasinghe ....... H04B 7/18506

FOREIGN PATENT DOCUMENTS

| JP | 2007-236026 A | 9/2007 |
| JP | 2009-095233 A | 4/2009 |
| JP | 2014-138429 A | 7/2014 |
| JP | 2016-163388 A | 9/2016 |

* cited by examiner

STATOR OF MOTOR HAVING UPPER AND LOWER INSULATOR

CROSS REFERENCE TO RELATED APPLICATIONS

This application claims the benefit of priority to Japanese Patent Application No. 2017-108449 filed on May 31, 2017. The entire contents of this application are hereby incorporated herein by reference.

BACKGROUND OF THE INVENTION

1. Field of the Invention

The present disclosure relates to a stator and a motor.

2. Description of the Related Art

An exemplary stator intended for an electric motor is disclosed. The stator includes a stator iron core having a plurality of slots and on which driving coils are provided. The driving coils are each provided around a corresponding one of pole teeth of the stator iron core with an insulator made of an insulating material interposed therebetween.

The pole teeth each include a pole-piece portion at the tip thereof. The pole-piece portion projects in the direction of rotation of a magnetic rotor. The insulator provided on the pole-piece portion has a flange that prevents the driving coil from collapsing toward the magnetic rotor. The corners of the flange each have an arc shape. One of each pair of diagonal corners of the flange forms a large-curvature arc portion. The other diagonal corner forms a small-curvature arc portion.

In such a configuration, a coil-winding nozzle advancing linearly can change its course earlier at the large-curvature arc portion. Therefore, the gap between the driving coil and the insulator can be reduced. Consequently, the height of the coil from the stator iron core that tends to increase at the corners in the axial direction can be reduced.

SUMMARY OF THE INVENTION

In a step of manufacturing the stator, if each insulator includes pieces that are separate in the direction of rotational axis of the magnetic rotor, a conducting wire that is wound into a driving coil may be caught at a connection between the separate pieces of the insulator. Such a situation may lead to a reduction in the productivity of the stator.

A stator according to an aspect of the present disclosure includes a stator core including a core back having an annular shape centered at a center axis extending in a vertical direction, an upper insulator provided on an upper side of the stator core, and a lower insulator provided on a lower side of the stator core. The stator core includes a plurality of teeth projecting radially from the core back, and a plurality of umbrella portions each extending in a circumferential direction from a radial end of a corresponding one of the teeth. The upper insulator covers at least a part of an upper surface of each of the teeth. The lower insulator covers at least a part of a lower surface of each of the teeth. The upper insulator and the lower insulator each include extended portions each extending in the circumferential direction near a radially outer end of a corresponding one of the teeth. The teeth are each provided with a coil formed of a conducting wire that is wound around the tooth with the upper insulator and the lower insulator in between. The extended portions of the lower insulator each have a guide portion at an edge on a circumferentially outer and upper side near a region where the conducting wire is led from the upper side toward the lower side when wound into the coil.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Exemplary embodiments of the present disclosure will now be described with reference to the drawings. In the following description, the direction in which a center axis C1 extends is defined as the vertical direction, the direction of the radius centered at the center axis C1 is defined as the radial direction, and the direction around the center axis C1 is defined as the circumferential direction. Note that the vertical direction defines neither the positional relationship nor the direction of relevant elements in a state where such elements are actually set in an associated apparatus. In the drawings, the upper side is denoted by X1, and the lower side is denoted by X2.

Figure 1:
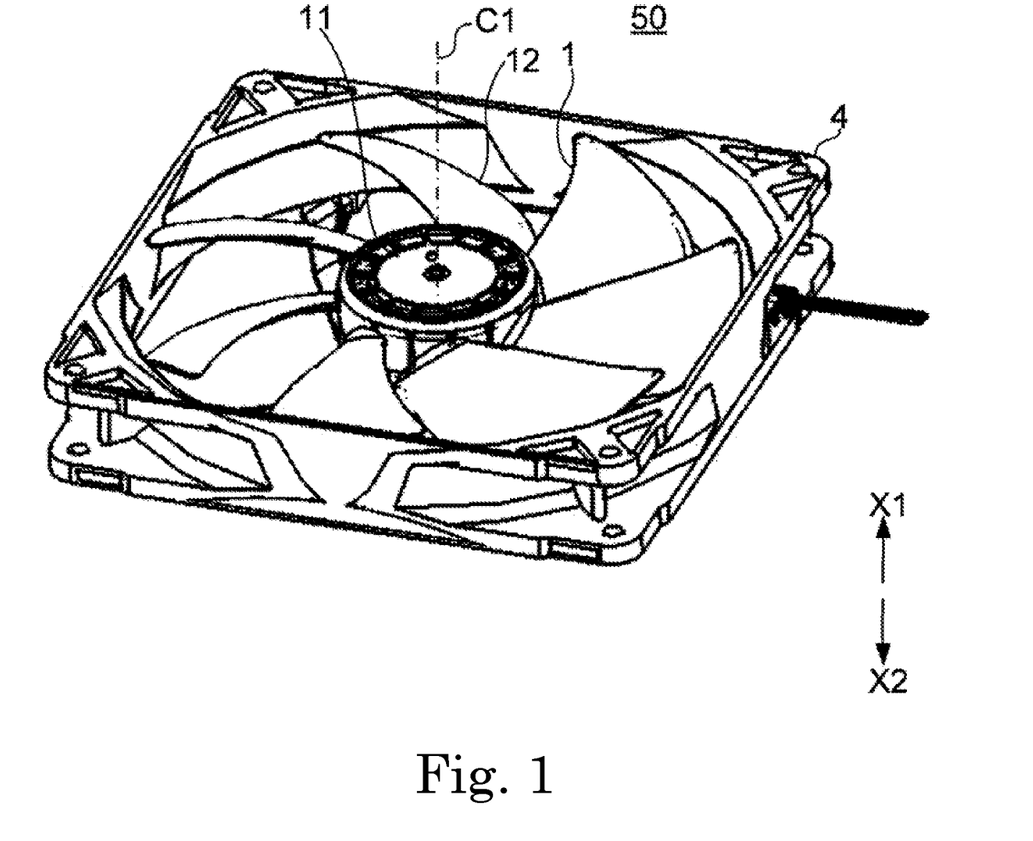
FIG. 1 is a perspective view of an axial-flow fan according to an embodiment of the present disclosure.
Figure 2:
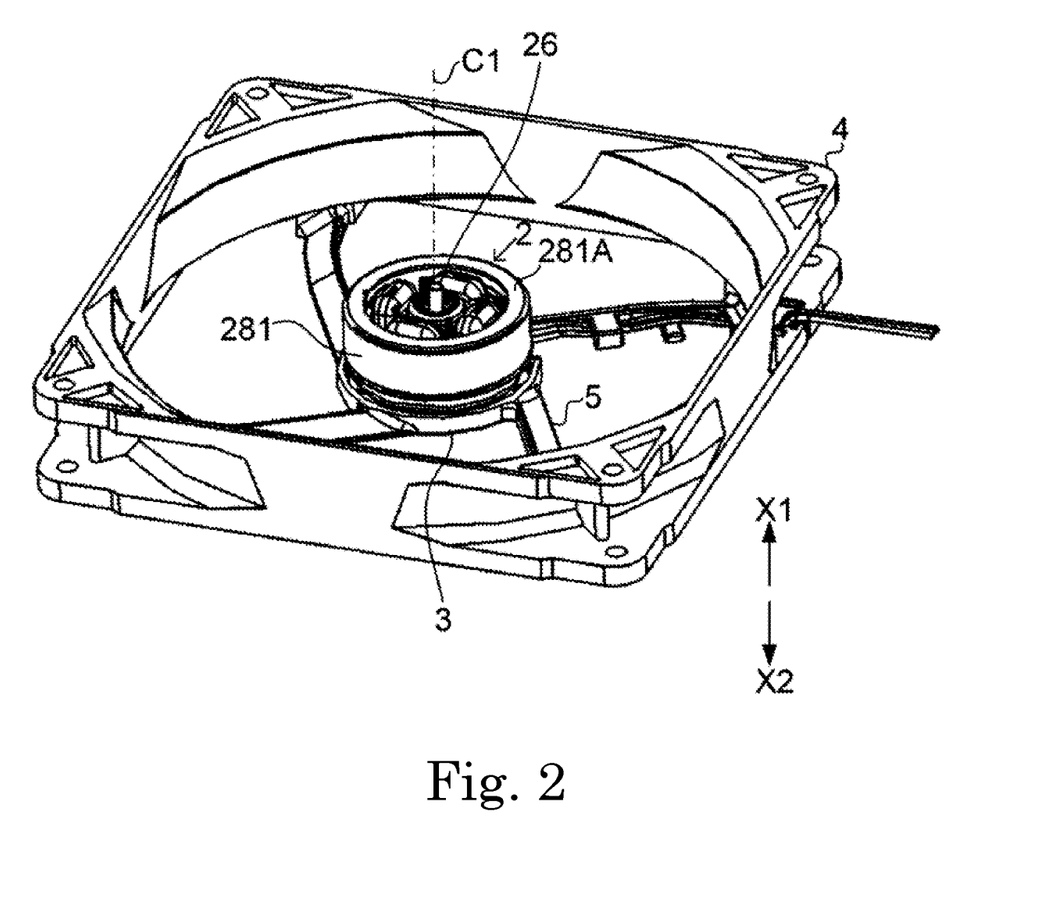
FIG. 2 is another perspective view of the axial-flow fan, with an impeller thereof removed.
Figure 3:
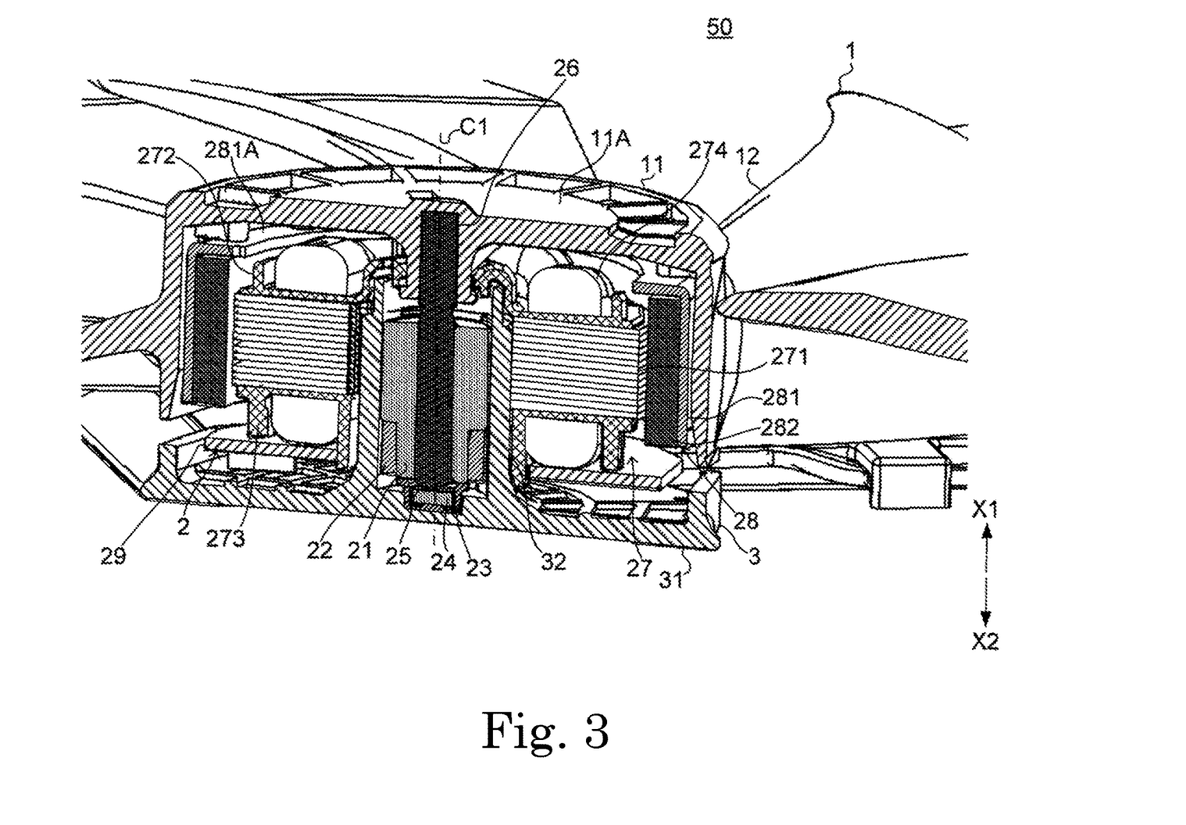
FIG. 3 is a partially vertical-sectional perspective view of the axial-flow fan according to the embodiment of the present disclosure.
Figure 4:
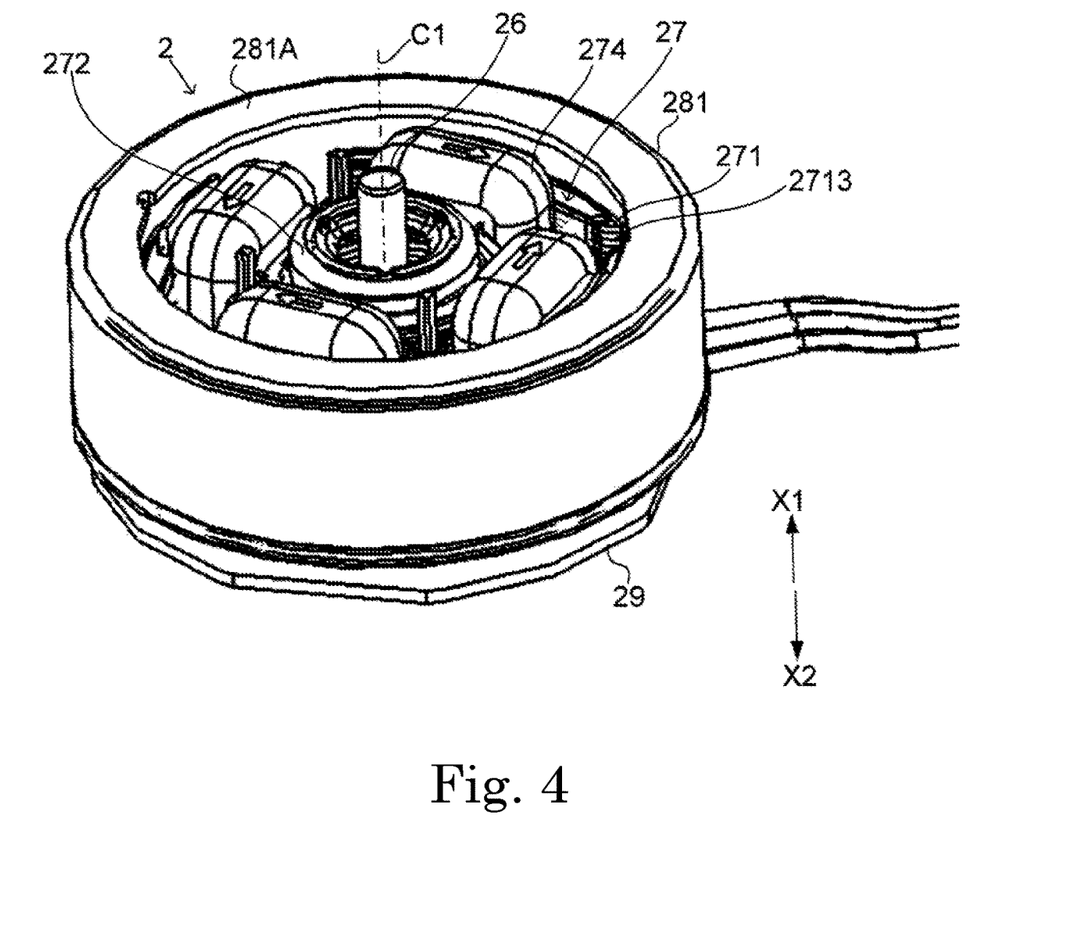
FIG. 4 is a perspective view of a motor included in the axial-flow fan.

An overall configuration of an axial-flow fan according to an embodiment of the present disclosure will first be described. FIG. 1 is a perspective view of an axial-flow fan 50 according to an embodiment of the present disclosure. FIG. 2 is another perspective view of the axial-flow fan 50, with an impeller 1 thereof removed. FIG. 3 is a partially vertical-sectional perspective view of the axial-flow fan 50. FIG. 4 is a perspective view of a motor 2 included in the axial-flow fan 50.

The axial-flow fan 50 includes the impeller 1, the motor 2, a motor base 3, a housing 4, and ribs 5.

The motor base 3, the housing 4, and the ribs 5 are provided as one integral member made of a resin material. The housing 4 houses the impeller 1 and the motor 2 and is positioned on the radially outer side with respect to the impeller 1 and the motor 2.

The motor 2 drives the impeller 1 to rotate on the center axis C1. The motor 2 includes a bearing portion 21, oil-retaining felt 22, a chip holder 23, an MG chip 24 (magnet chip), a washer 25, a shaft 26, a stator 27, a rotor 28, and a circuit board 29.

The motor base 3 is connected to the housing 4 with the ribs 5 at four positions in the circumferential direction, thereby supporting the motor 2. The motor base 3 includes a base portion 31 spreading radially on the lower side thereof, and a bearing-holding portion 32 projecting upward from a central part of the base portion 31.

The bearing-holding portion 32 holds the bearing portion thereinside. The bearing portion 21 is a sleeve bearing. Alternatively, the bearing portion 21 may be a pair of ball bearings that are positioned on the upper side and the lower side, respectively.

The bearing-holding portion 32 also holds thereinside the oil-retaining felt 22, the chip holder 23, the MG chip 24, and the washer 25, as well as the bearing portion 21.

The shaft 26 is a columnar member extending vertically along the center axis C1 and is made of metal such as stainless steel. The bearing portion 21 holds the shaft 26 such that the shaft 26 is rotatable on the center axis C1.

The stator 27 is positioned on the radially outer side of the bearing-holding portion 32 and is fixed to the bearing-holding portion 32. The stator 27 includes a stator core 271, an upper insulator 272, a lower insulator 273, and a plurality of coils 274. The stator core 271 is made of lamination steel obtained by vertically stacking electromagnetic steel sheets such as silicon steel sheets. The upper insulator 272 and the lower insulator 273 are made of insulating resin. The coils 274 are each obtained by winding a conducting wire vertically around the stator core 271 with the upper insulator 272 and the lower insulator 273 interposed therebetween. Details of the stator 27 will be described separately below.

The circuit board 29 is provided below the stator core 271. The circuit board 29 carries an electronic circuit that supplies a driving current to the coils 274. Leaders of the respective coils 274 are electrically connected to the electronic circuit.

The rotor 28 includes a rotor yoke 281 and a magnet 282. The rotor yoke 281 is a substantially cylindrical member having a top plate portion 281A at the top thereof and being open at the bottom thereof. The rotor yoke 281 is a magnetic body. The top plate portion 281A has an opening extending vertically therethrough. The magnet 282 has a cylindrical shape and is fixed to the inner peripheral surface of the rotor yoke 281. The magnet 282 is positioned on the radially outer side of the stator 27. The pole face of the magnet 282 that is on the inner peripheral side is sectioned into north (N) poles and south (S) poles that are alternately arranged in the circumferential direction. The rotor yoke 281 and the magnet 282 in combination form a magnetic circuit, whereby the amount of magnetic flux leaking from the magnet 282 to the outside of the axial-flow fan 50 is reduced.

The impeller 1 includes an impeller cup 11 and a plurality of blades 12 and is made of a resin material. The impeller cup 11 is a substantially cylindrical member having a lid 11A at the top thereof. The shaft 26 is fixed to the lid 11A. The rotor yoke 281 is fixed to the inside of the impeller cup 11. The plurality of blades 12 are provided on the radially outer side of the impeller cup 11.

In the axial-flow fan 50 configured as above, when a driving current is supplied to the coils 274 of the stator 27, the stator core 271 generates magnetic flux in the radial direction. With the effect of the magnetic flux generated between the stator core 271 and the magnet 282, a torque acting in the circumferential direction is applied to the rotor 28. Consequently, a rotating unit as a combination of the rotor 28 and the impeller 1 rotates on the center axis C1. The impeller 1 rotates counterclockwise in top view.

When the impeller 1 rotates, an air current is generated by the plurality of blades 12. Specifically, an air current is generated with the upper side of the axial-flow fan 50 serving as the intake side and the lower side of the axial-flow fan 50 serving as the exhaust side. Thus, the axial-flow fan 50 can send air.

Figure 5:
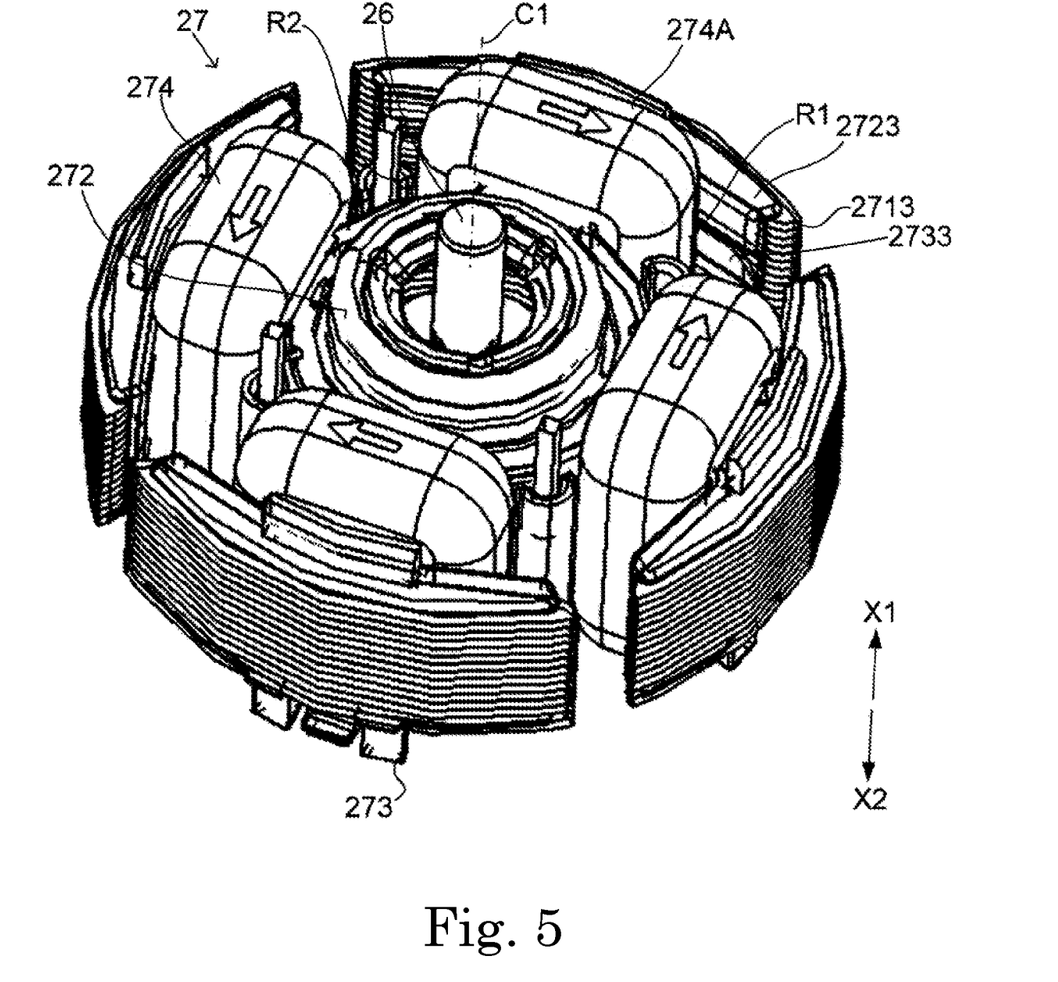
FIG. 5 is a perspective view of a stator according to the embodiment of the present disclosure.
Figure 6A:
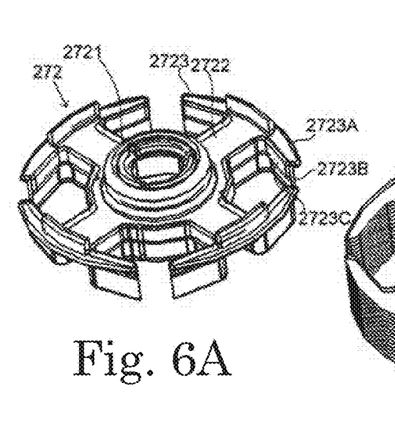
FIGS. 6A, 6B, and 6C are perspective views of relevant elements included in the stator.
Figures 6B, 6C:
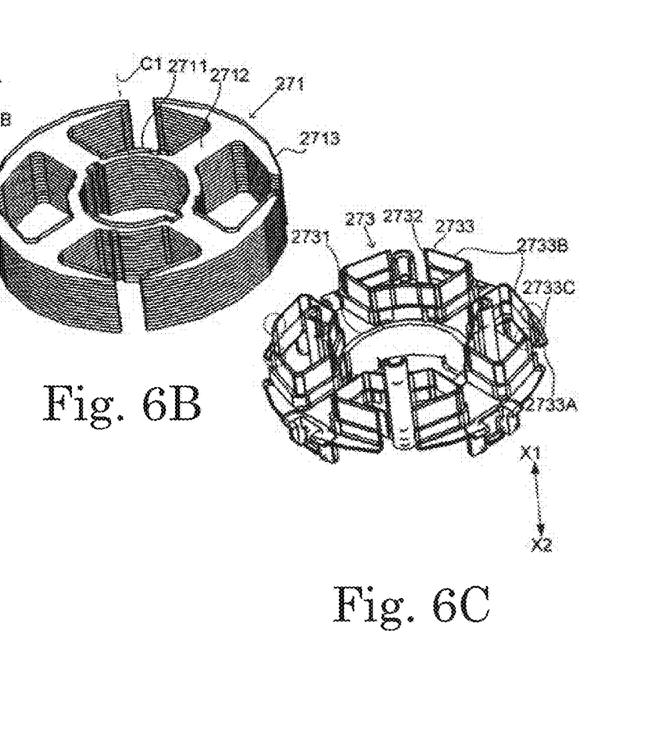

A configuration of the stator 27 included in the motor 2 according to the present embodiment will now be described in detail. FIG. 5 is a perspective view of the stator 27 according to the present embodiment. FIGS. 6A, 6B, and 6C are perspective views of relevant elements, excluding the coils 274, included in the stator 27. FIG. 6A is a perspective view of the upper insulator 272. FIG. 6B is a perspective view of the stator core 271. FIG. 6C is a perspective view of the lower insulator 273.

As illustrated in FIGS. 6A to 6C, the stator core 271 includes a core back 2711, a plurality of teeth 2712, and a plurality of umbrella portions 2713. The core back 2711 has an annular shape centered at the center axis C1 and is positioned at the center of the stator core 271.

The plurality of teeth 2712 project radially outward from the outer peripheral surface of the core back 2711. In the present embodiment, four teeth 2712 are provided, for example. That is, the motor 2 according to the present embodiment is a four-slot motor. The umbrella portions 2713 are each provided at a radially outer end of a corresponding one of the teeth 2712 and each extend in the circumferential direction therefrom. That is, the number of umbrella portions 2713 is the same as the number of teeth 2712.

The upper insulator 272 is provided on the upper side of the stator core 271. The upper insulator 272 includes a central upper-cover portion 2721, a plurality of tooth-upper-cover portions 2722, and a plurality of extended portions 2723.

The central upper-cover portion 2721 covers the upper surface and the outer peripheral surface of the core back 2711. The tooth-upper-cover portions 2722 project radially outward from the central upper-cover portion 2721. The tooth-upper-cover portions 2722 each cover the upper surface of a corresponding one of the teeth 2712 and surfaces of the tooth 2712 that are opposite each other in the circumferential direction. The number of tooth-upper-cover portions 2722 is the same as the number of teeth 2712.

The extended portions 2723 are each provided at the radially outer end of a corresponding one of the tooth-upper-cover portions 2722 and each extend in the circumferential direction therefrom. The extended portions 2723 each cover the upper surface of a corresponding one of the umbrella portions 2713 and a side surface of the umbrella portion 2713 that faces the core back 2711. The number of extended portions 2723 is the same as the number of tooth-upper-cover portions 2722.

The extended portions 2723 each include an extended cover portion 2723A, an upper-insulator wall portion 2723B, and an assist wall portion 2723C. The extended cover portion 2723A is a plate-like member provided at the radially outer end of the upper surface of the tooth-upper-cover portion 2722 and extending in the circumferential direction therefrom.

The upper-insulator wall portion 2723B extends in the circumferential direction from both circumferential sides of the tooth-upper-cover portion 2722 and projects downward from the extended cover portion 2723A. The assist wall portion 2723C extends in the circumferential direction from both circumferential sides of the tooth-upper-cover portion 2722 and projects downward from the radially inner edge of the extended cover portion 2723A. The assist wall portion 2723C is in contact with the upper-insulator wall portion 2723B on the radially inner side of the upper-insulator wall portion 2723B. The length of projection of the assist wall portion 2723C is shorter than the length of projection of the upper-insulator wall portion 2723B.

The lower insulator 273 is provided on the lower side of the stator core 271. The lower insulator 273 includes a central lower-cover portion 2731, a plurality of tooth-lower-cover portions 2732, and a plurality of extended portions 2733.

The central lower-cover portion 2731 covers the lower surface and the outer peripheral surface of the core back 2711. The tooth-lower-cover portions 2732 project radially outward from the central lower-cover portion 2731. The tooth-lower-cover portions 2732 each cover the lower surface of a corresponding one of the teeth 2712 and surfaces of the tooth 2712 that are opposite each other in the circumferential direction. The number of tooth-lower-cover portions 2732 is the same as the number of teeth 2712.

The extended portions 2733 are each provided at the radially outer end of a corresponding one of the tooth-lower-cover portions 2732 and each extend in the circumferential direction therefrom. The extended portions 2733 each cover the lower surface of a corresponding one of the umbrella portions 2713 and a side surface of the umbrella portion 2713 that faces the core back 2711. The number of extended portions 2733 is the same as the number of tooth-lower-cover portions 2732.

The extended portions 2733 each include an extended cover portion 2733A, a lower-insulator wall portion 2733B, and an assist wall portion 2733C. The extended cover portion 2733A is a plate-like member provided at the radially outer end of the lower surface of the tooth-lower-cover portion 2732 and extending in the circumferential direction therefrom.

The lower-insulator wall portion 2733B extends in the circumferential direction from both circumferential sides of the tooth-lower-cover portion 2732 and projects upward from the radially inner edge of the extended cover portion 2733A. The assist wall portion 2733C extends in the circumferential direction from both circumferential sides of the tooth-lower-cover portion 2732 and projects upward from the extended cover portion 2733A. The assist wall portion 2733C is in contact with the lower-insulator wall portion 2733B on the radially outer side of the lower-insulator wall portion 2733B. The length of projection of the assist wall portion 2733C is shorter than the length of projection of the lower-insulator wall portion 2733B.

With the upper insulator 272 being attached to the upper side of the stator core 271, the extended cover portion 2723A is in contact with a part of the upper surface of the umbrella portion 2713 and covers the part of the upper surface from the upper side, and the upper-insulator wall portion 2723B is in contact with the surface of the umbrella portion 2713 that faces the core back 2711.

With the lower insulator 273 being attached to the lower side of the stator core 271, the extended cover portion 2733A is in contact with a part of the lower surface of the umbrella portion 2713 and covers the part of the lower surface from the lower side, and the assist wall portion 2733C is in contact with the surface of the umbrella portion 2713 that faces the core back 2711.

To summarize, at least a part of each of the extended portions 2723 and 2733 is in contact with the surface of a corresponding one of the umbrella portions 2713 that faces the core back 2711. Therefore, the upper insulator 272 and the lower insulator 273 are firmly fixed to the stator core 271.

Furthermore, at least a part of each of the extended portions 2723 of the upper insulator 272 is in contact with the upper surface of a corresponding one of the umbrella portions 2713, and at least a part of each of the extended portions 2733 of the lower insulator 273 is in contact with the lower surface of a corresponding one of the umbrella portions 2713. Therefore, the upper insulator 272 and the lower insulator 273 are positioned in the axial direction.

With the upper insulator 272 and the lower insulator 273 being fixed to the stator core 271 as described above, conducting wires are wound therearound to form the coils 274, respectively, whereby the stator 27 is obtained. Specifically, a conducting wire is wound vertically around each of the tooth-upper-cover portions 2722 and a corresponding one of the tooth-lower-cover portions 2732, whereby the coil 274 is obtained. That is, the conducting wire is wound around each of the teeth 2712 with the upper insulator 272 and the lower insulator 273 interposed therebetween.

As illustrated in FIG. 5, the coils 274 are provided on the teeth 2712, respectively. That is, four coils 274 are provided for the four teeth 2712, respectively. The white arrows illustrated on the respective coils 274 in FIG. 5 each indicate the direction in which the conducting wire is wound.

Figure 7:
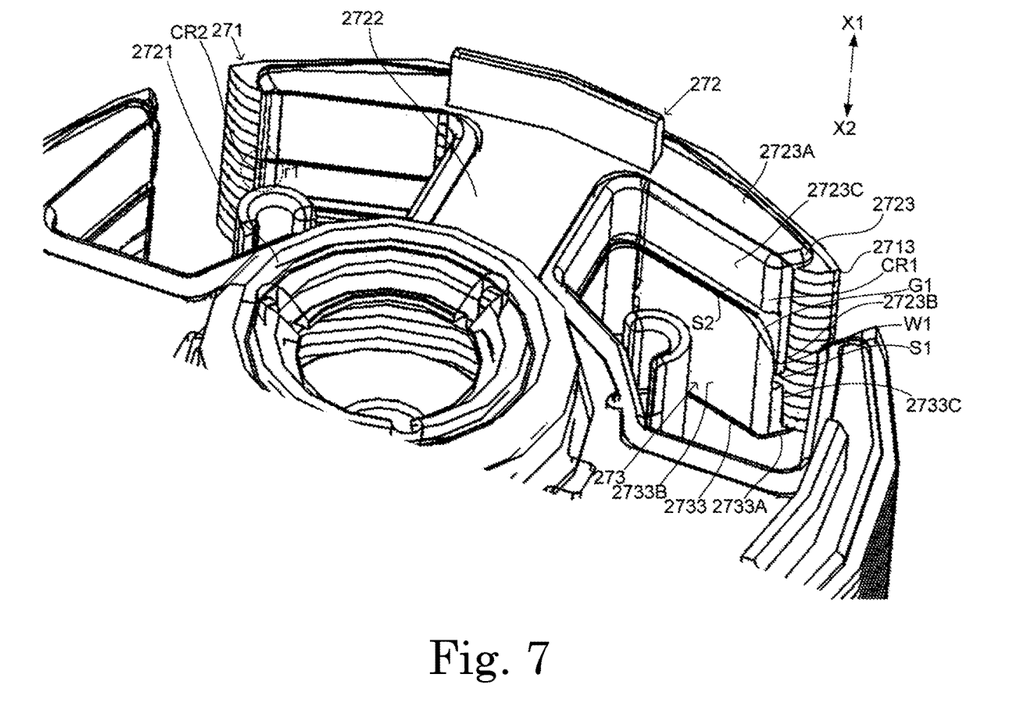
FIG. 7 is an enlarged view of relevant part of the stator.

FIG. 7 is an enlarged view of a part where a coil 274A among the four coils 274 illustrated in FIG. 5 is provided, and illustrates a representative configuration of the upper insulator 272, the lower insulator 273, and the stator core 271. As illustrated in FIG. 7, the lower-insulator wall portion 2733B has a guide portion G1 at an edge thereof on the circumferentially outer and upper side. The guide portion G1 is positioned near a region R1 of the coil 274A obtained by winding a conducting wire in the direction represented by the white arrow in FIG. 5. In the region R1, the conducting wire is led from the upper side toward the lower side.

As described above, the stator 27 according to the present embodiment includes the stator core 271 including the core back 2711 having an annular shape centered at the center axis C1 extending in the vertical direction, the upper insulator 272 provided on the upper side of the stator core 271, and the lower insulator 273 provided on the lower side of the stator core 271. The stator core 271 includes the plurality of teeth 2712 projecting radially from the core back 2711, and the umbrella portions 2713 each extending in the circumferential direction from a radial end of a corresponding one of the teeth 2712. The upper insulator 272 covers at least a part of the upper surface of each of the teeth 2712. The lower insulator 273 covers at least a part of the lower surface of each of the teeth 2712. The upper insulator 272 and the lower insulator 273 each include the extended portions 2723 or 2733 each extending in the circumferential direction near the radially outer end of a corresponding one of the teeth 2712. The teeth 2712 are each provided with the coil 274 formed of a conducting wire that is wound therearound with the upper insulator 272 and the lower insulator 273 in between. The extended portions 2733 of the lower insulator 273 each have the guide portion G1 at the edge thereof on the circumferentially outer and upper side near the region R1 where the conducting wire is led from the upper side toward the lower side when wound into the coil 274.

In such a configuration, when a conducting wire is wound into the coil 274, even if the conducting wire that is led from the upper side toward the lower side comes into contact with the extended portion 2733, the conducting wire is guided along the guide portion G1 and moves away from the extended portion 2733. Therefore, the conducting wire is less likely to be caught by the extended portion 2733. Consequently, the productivity of the stator 27 is improved.

As illustrated in FIG. 7, the lower-insulator wall portion 2733B is positioned on the radially inner side with respect to the upper-insulator wall portion 2723B. The lower-insulator wall portion 2733B and the upper-insulator wall portion 2723B face each other with a gap in between, whereby a groove W1 is produced at the gap. In a region r1 (see FIG. 7) near a region R2 where the conducting wire to form the coil 274A illustrated in FIG. 5 is led from the lower side toward the upper side, the lower-insulator wall portion 2733B has no guide portion. That is, the lower-insulator wall portion 2733B has only one guide portion G1 as a guide portion.

To summarize, the extended portions 2733 of the lower insulator 273 each include the lower-insulator wall portion 2733B extending in the circumferential direction and projecting upward. The extended portion 2723 of the upper insulator 272 includes the upper-insulator wall portion 2723B extending in the circumferential direction and projecting downward. The lower-insulator wall portion 2733B is positioned on the radially inner side with respect to the upper-insulator wall portion 2723B. The lower-insulator wall portion 2733B and the upper-insulator wall portion 2723B face each other with a gap interposed therebetween such that the groove W1 is produced. The lower-insulator wall portion 2733B has the guide portion G1 only at the edge thereof on the circumferentially outer and upper side near the region R1 where the conducting wire is led from the upper side toward the lower side.

If the guide portion G1 is not provided, the conducting wire is more likely to be caught in the groove W1 near the region R1 where the conducting wire is led from the upper side toward the lower side. In contrast, according to the present embodiment, since the guide portion G1 is provided, the conducting wire is guided along the guide portion G1 in such a manner as to move out of the groove W1 and thus moves away from the lower-insulator wall portion 2733B. On the other hand, near the region R2 where the conducting wire is led from the lower side toward the upper side, the groove W1 extends in a direction opposite to the direction in which the conducting wire is led. Therefore, the conducting wire is less likely to be caught in the groove W1, and the guide portion that guides the conducting wire is not necessary. Since no guide portion is provided near the region R2 where the conducting wire is led from the lower side toward the upper side, the widening of the gap between the lower insulator 273 and the upper insulator 272 is avoided.

The assist wall portion 2723C of the upper insulator 272 has an upper-insulator corner portion CR1 extending circumferentially outward and downward in a region facing the guide portion G1 in the axial direction.

In other words, the extended portions 2723 of the upper insulator 272 each have the upper-insulator corner portion CR1 extending circumferentially outward and downward in the region facing the guide portion G1 in the axial direction. Therefore, the gap between the lower insulator 273 and the upper insulator 272 is reduced. Consequently, the conducting wire is less likely to be caught in the gap.

On the other hand, the lower-insulator wall portion 2733B has a lower-insulator corner portion CR2 extending circumferentially outward and upward at an end thereof opposite the guide portion G1 in the circumferential direction.

In other words, the extended portions 2733 of the lower insulator 273 each have the lower-insulator corner portion CR2 extending circumferentially outward and upward at an end thereof opposite the guide portion G1 in the circumferential direction. Therefore, the gap between the upper and lower insulators 272 and 273 is reduced on both sides in the circumferential direction. Consequently, the conducting wire is less likely to be caught in the gap.

The upper-insulator wall portion 2723B and the assist wall portion 2733C face each other in the axial direction with a gap S1 interposed therebetween. The assist wall portion 2723C and the lower-insulator wall portion 2733B face each other in the axial direction with a gap S2 interposed therebetween. That is, each of the extended portions 2723 of the upper insulator 272 and a corresponding one of the extended portions 2733 of the lower insulator 273 face each other in the axial direction with the gap S2 in between.

According to the present embodiment, the stator 27 is designed to have the gap S2, even if the lamination of the stator core 271 has an error, so that the stator core 271 is held between the extended portions 2723 of the upper insulator 272 and the extended portions 2733 of the lower insulator 273 in the axial direction. In the case where the gap S2 is provided, the guide portion G1 is also provided. Therefore, the probability that the conducting wire may be caught by any peripheral element is reduced.

The guide portion G1 has a curved surface that smoothly curves circumferentially outward and downward. Therefore, the probability that the conducting wire may be caught by the extended portion 2733 is further reduced. The guide portion G1 does not necessarily need to have the above curved surface and may have, for example, a linear surface inclining downward toward the circumferentially outer side.

The above description provided with reference to FIG. 7 concerns a configuration in which the guide portion G1 is provided to the lower-insulator wall portion 2733B near the region R1 where the conducting wire to form the coil 274A (see FIG. 5) is led downward. Likewise, regarding each of the remaining three coils 274, the lower-insulator wall portion 2733B has the guide portion G1 near the region where the conducting wire is led downward. That is, as illustrated in FIG. 6C, the lower insulator 273 has the guide portion G1 in each of the encircled regions of all extended portions 2733 provided in correspondence with the teeth 2712.

Hence, the number of guide portions G1 is the same as the number of teeth 2712. Therefore, the probability that the conducting wire may be caught by any peripheral element is reduced for all of the teeth 2712.

Surfaces of the assist wall portion 2723C and the lower-insulator wall portion 2733B that are on the radially inner side are curved. That is, radially inner surfaces of the extended portions 2723 and 2733 are curved. Therefore, the length of a portion of each of the upper and lower insulators 272 and 273 where the conducting wire is woundable is increased. Accordingly, the number of turns of the coil can be increased. Specifically, the tooth-upper-cover portion 2722 can be made longer than in a case where the radially inner surfaces of the extended portions 2723 and 2733 extend linearly in a direction orthogonal to the direction in which the tooth-upper-cover portion 2722 extends. Therefore, the space in which the conducting wire is woundable is increased. Note that the radially inner surfaces of the extended portions 2723 and 2733 do not necessarily need to be curved.

Referring to FIG. 4, in the motor 2, the rotor yoke 281 is positioned on the radially outer side with respect to the umbrella portions 2713. The magnet 282 fixed to the inner peripheral surface of the rotor yoke 281 is positioned on the radially outer side with respect to the umbrella portions 2713.

That is, the motor 2 according to the present embodiment is a so-called outer-rotor motor and includes the stator 27, and the rotor 28 positioned on the radially outer side with respect to the stator 27 and that is rotatable relative to the stator 27. Since the productivity of the stator 27 is improved as described above, the productivity of the motor 2 is improved accordingly.

The umbrella portions 2713 are positioned on the radially outer side with respect to the core back 2711. The rotor 28 is positioned on the radially outer side with respect to the umbrella portions 2713. In such an outer-rotor motor, the extended portions 2723 and 2733 extend in the circumferential direction along the umbrella portions 2713. In such a case also, the probability that the conducting wire may be caught by any peripheral element is reduced with the presence of the guide portion G1.

While some embodiments of the present disclosure have been described above, those embodiments may be modified or combined in various ways within the scope of the present disclosure.

For example, the present disclosure may be applied to a so-called inner-rotor motor. In that case, teeth project radially inward from an annular core back of a stator core, umbrella portions each extend in the circumferential direction from a radially inner end of a corresponding one of the teeth, and a rotor is positioned on the radially inner side with respect to the umbrella portions. Extended portions of the upper insulator and the lower insulator each extend in the circumferential direction along the core back. The extended portions of the lower insulator each have a guide portion.

To summarize, the above inner-rotor motor includes a stator, and a rotor positioned on the radially inner side with respect to the stator and that is rotatable relative to the stator. Thus, the probability that the conducting wire may be caught by any peripheral element is reduced, whereby the productivity of the stator is improved. Consequently, the productivity of the inner-rotor motor is improved.

The present disclosure is preferably applicable to a motor to be included in, for example, an axial-flow fan. The present disclosure may also be applied to a centrifugal fan, a mixed-flow fan, or the like.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
    a stator core including a core back having an annular shape centered at a center axis extending in a vertical direction;
    an upper insulator provided on an upper side of the stator core; and
    a lower insulator provided on a lower side of the stator core; wherein
    the stator core includes:
        teeth projecting out from the core back in a radial direction; and
        umbrella portions each extending in a circumferential direction from a radial end of a corresponding one of the teeth;
    the upper insulator covers at least a portion of an upper surface of each of the teeth;
    the lower insulator covers at least a portion of a lower surface of each of the teeth;
    the upper insulator and the lower insulator each include extended portions each extending in the circumferential direction near a radially outer end of a corresponding one of the teeth;
    the teeth are each provided with a coil defined by a conducting wire that is wound around the tooth with the upper insulator and the lower insulator in between;
    the extended portions of the lower insulator each include a guide portion at an edge on a circumferentially outer and upper side of the lower insulator adjacent to a region where the conducting wire is led from an upper side of the lower insulator toward a lower side of the lower insulator when wound into the coil;
    the guide portion includes a curved surface that curves circumferentially outward and downward; and
    the guide portion is at a position which overlaps one of the teeth when viewed in the radial direction.

2. The stator according to claim 1, wherein
    the extended portions of the lower insulator each include a lower-insulator wall portion extending in the circumferential direction and projecting upward;
    the extended portions of the upper insulator each include an upper-insulator wall portion extending in the circumferential direction and projecting downward;
    the lower-insulator wall portion is positioned radially inward from the upper-insulator wall portion;
    the lower-insulator wall portion and the upper-insulator wall portion oppose each other with a gap in between to define a groove; and
    the lower-insulator wall portion includes the guide portion only at an edge on the circumferentially outer and upper side of the lower insulator adjacent to the region where the conducting wire is led from the upper side toward the lower side.

3. The stator according to claim 1, wherein
    the extended portions of the upper insulator each include an upper-insulator corner portion extending circumferentially outward and downward in a region opposing the guide portion in an axial direction.

4. The stator according to claim 3, wherein
    the extended portions of the lower insulator each include a lower-insulator corner portion extending circumferentially outward and upward at an end opposite the guide portion in the circumferential direction.

5. The stator according to claim 1, wherein
    each of the extended portions of the upper insulator and a corresponding one of the extended portions of the lower insulator oppose each other in an axial direction with a gap in between.

6. The stator according to claim 1, wherein
    a total number of guide portions is the same as a total number of teeth.

7. The stator according to claim 1, wherein
    at least a portion of each of the extended portions is in contact with a surface of a corresponding one of the umbrella portions that opposes the core back.

8. The stator according to claim 1, wherein
    at least a portion of each of the extended portions of the upper insulator is in contact with an upper surface of a corresponding one of the umbrella portions; and
    at least a portion of each of the extended portions of the lower insulator is in contact with a lower surface of a corresponding one of the umbrella portions.

9. The stator according to claim 1,
    wherein a radially inner surface of each of the extended portions is curved.

10. A motor comprising:
the stator according to claim 1; and
a rotor positioned on a radially outer or radially inner side with respect to the stator and that is rotatable relative to the stator.

11. The motor according to claim 10, wherein
the umbrella portions are positioned on the radially outer side with respect to the core back; and
the rotor is positioned on the radially outer side with respect to the umbrella portions.

* * * * *